(12) United States Patent
Kubo et al.

(10) Patent No.: US 11,305,668 B2
(45) Date of Patent: Apr. 19, 2022

(54) DETERIORATION INFORMATION OUTPUT APPARATUS AND DETERIORATION INFORMATION OUTPUT METHOD

(71) Applicant: TOYOTA JIDOSHA KABUSHIKI KAISHA, Toyota (JP)

(72) Inventors: Kazuki Kubo, Toyota (JP); Yoshihiro Uchida, Nagakute (JP); Junta Izumi, Nagoya (JP); Masaki Uchiyama, Obu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 158 days.

(21) Appl. No.: 16/656,709

(22) Filed: Oct. 18, 2019

(65) Prior Publication Data

US 2020/0122603 A1  Apr. 23, 2020

(30) Foreign Application Priority Data

Oct. 19, 2018  (JP) .............................. JP2018-197634

(51) Int. Cl.
| | |
|---|---|
| *G01R 31/00* | (2006.01) |
| *B60L 58/16* | (2019.01) |
| *G07C 5/08* | (2006.01) |
| *B60L 50/60* | (2019.01) |
| *B60L 50/51* | (2019.01) |

(52) U.S. Cl.
CPC .............. *B60L 58/16* (2019.02); *G07C 5/085* (2013.01); *B60L 50/51* (2019.02); *B60L 50/60* (2019.02); *B60L 2210/40* (2013.01)

(58) Field of Classification Search
CPC ................................. B60L 58/16; G07C 5/085
See application file for complete search history.

(56) References Cited

U.S. PATENT DOCUMENTS

2015/0301123 A1* 10/2015 Tao ...................... G01R 31/392
324/426
2018/0050601 A1  2/2018 Katanoda

FOREIGN PATENT DOCUMENTS

JP  2018-029430 A  2/2018

* cited by examiner

*Primary Examiner* — Adam D Tissot
(74) *Attorney, Agent, or Firm* — Sughrue Mion, PLLC

(57) ABSTRACT

A controller performs processing including estimating a current degree of deterioration based on battery use history data when it is determined that deterioration diagnosis timing has come, setting a deterioration curve, setting a deterioration straight line, obtaining an elapsed time, obtaining a capacity retention based on the elapsed time and the deterioration straight line, updating representation of the capacity retention on an output unit, and showing an initial value as the capacity retention when it is determined that the deterioration straight line has not been set.

2 Claims, 5 Drawing Sheets

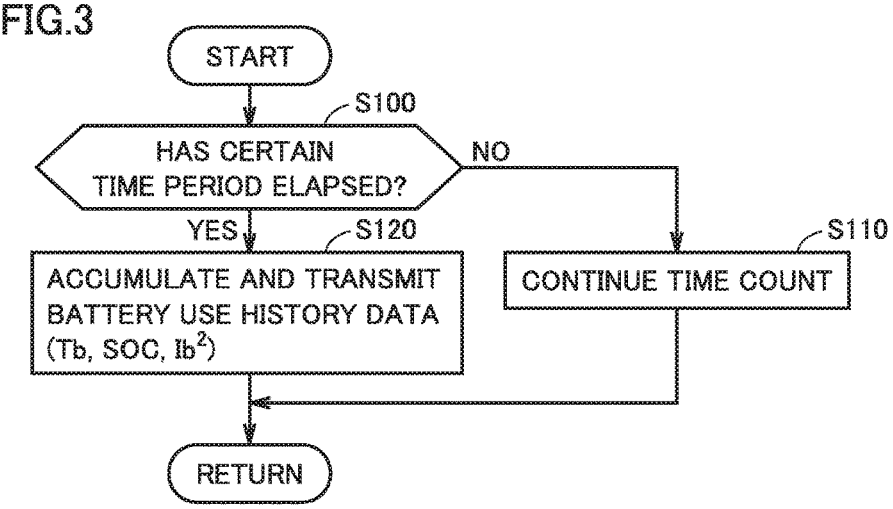
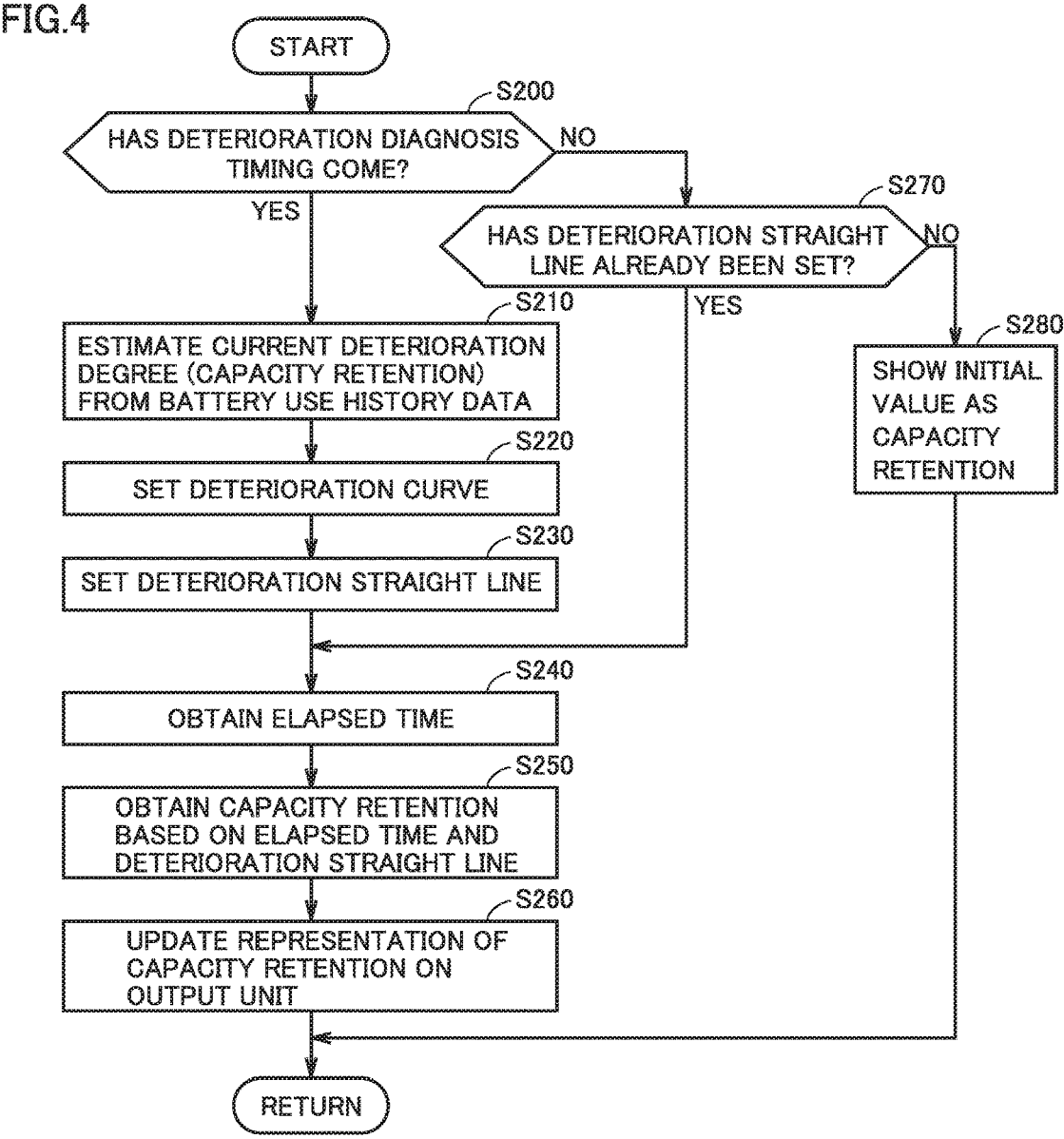

FIG.5
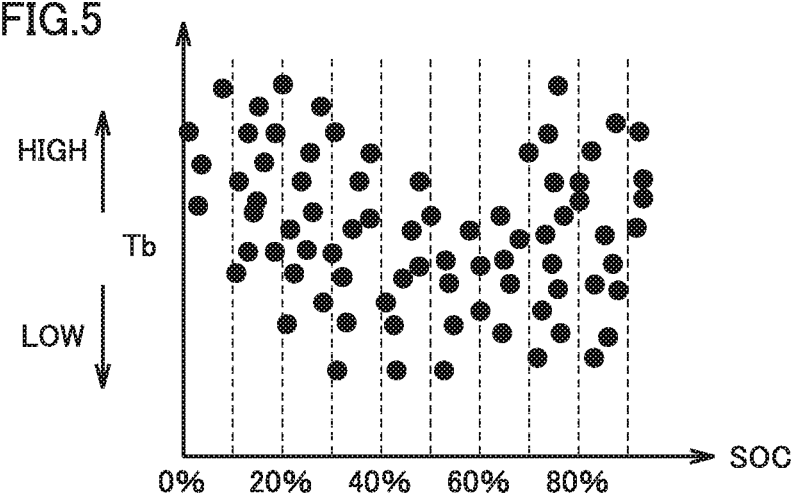
FIG.6
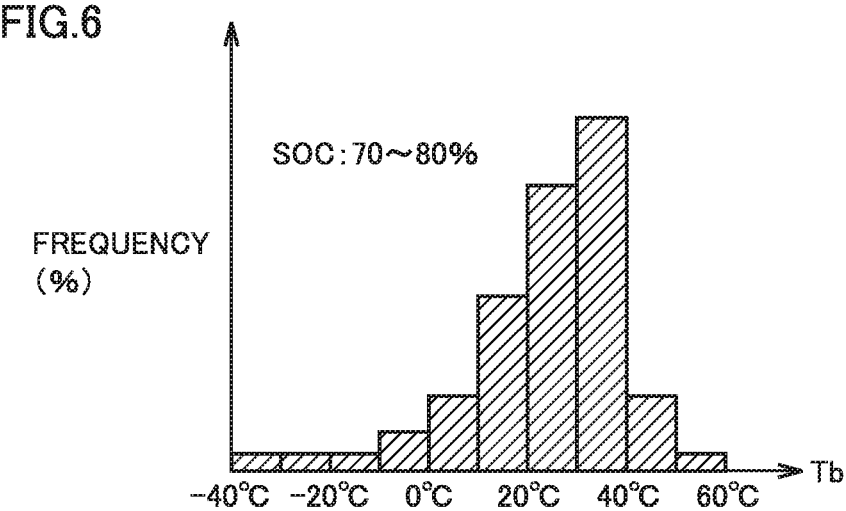
FIG.7
|  |  | SOC(%) | | | | |
|---|---|---|---|---|---|---|
|  |  | 0~5 | 5~10 | ... | 90~95 | 95~100 |
| Tb (°C) | −40~ | R11 |  | ... |  | Rm1 |
|  | −35~ | R12 |  | ... |  | Rm2 |
|  | ⋮ | ⋮ | ⋮ | ... |  | ⋮ |
|  | 60~ | R1n |  | ... |  | Rmn |

DETERIORATION INFORMATION OUTPUT APPARATUS AND DETERIORATION INFORMATION OUTPUT METHOD

This nonprovisional application is based on Japanese Patent Application No. 2018-197634 filed with the Japan Patent Office on Oct. 19, 2018, the entire contents of which are hereby incorporated by reference.

BACKGROUND

Field

The present disclosure relates to a deterioration information output apparatus and a deterioration information output method for outputting information on deterioration of a secondary battery mounted on an electrically powered vehicle.

Description of the Background Art

A secondary battery which supplies electric power to a motor is mounted on an electrically powered vehicle driven by a motor, such as an electric vehicle and a hybrid vehicle. A secondary battery has been known to suffer from increase in internal resistance or lowering in full charge capacity due to deterioration over time as it is used. In particular, when the full charge capacity becomes low, there are concerns about decrease in energy which can be recovered in regenerative braking during running and decrease in driving range which can be achieved by energy stored in the secondary battery. Therefore, a degree of deterioration of the secondary battery is estimated and information on the degree of deterioration of the secondary battery is visually or auditorily provided to a user so that the user can accurately recognize a state of deterioration of the secondary battery.

For example, Japanese Patent Laying-Open No. 2018-029430 discloses a technique to accurately estimate a degree of deterioration of a secondary battery.

SUMMARY

In general, however, a full charge capacity of a secondary battery has such characteristics that a rate of deterioration thereof in an initial stage is higher than a subsequent rate of deterioration. Therefore, when highly accurate information on a degree of deterioration of a secondary battery is output to a user or the like, the information that the degree of deterioration of the secondary battery has increased (that is, the full charge capacity has lowered) soon after start of use of a delivered electrically powered vehicle may be output to the user or the like. Consequently, the user may feel strange about change in degree of deterioration (full charge capacity) of the secondary battery or misunderstand such a situation as failure of the secondary battery.

An object of the present disclosure is to provide a deterioration information output apparatus and a deterioration information output method for outputting information on deterioration of a secondary battery without misleading a user.

A deterioration information output apparatus according to one aspect of the present disclosure includes a memory configured to accumulate use history data of a secondary battery mounted as a motive power source for an electrically powered vehicle, an output unit configured to output deterioration information on a degree of deterioration of the secondary battery, and a control unit configured to set the deterioration information and have the output unit output the deterioration information. The control unit is configured to estimate based on the use history data, a first degree of deterioration of the secondary battery at a first time point after lapse of a predetermined period since start of use of the electrically powered vehicle. The control unit is configured to set a deterioration curve representing change over time in degree of deterioration of the secondary battery since the start of use based on the estimated first degree of deterioration. The control unit is configured to estimate based on the deterioration curve, a second degree of deterioration of the secondary battery at a second time point later than the first time point. The control unit is configured to set a deterioration straight line representing linear change over time from the first time point until the second time point in degree of deterioration of the secondary battery from an initial value to the second degree of deterioration. The control unit is configured to obtain the degree of deterioration of the secondary battery corresponding to time elapsed since the first time point based on the deterioration straight line and set the deterioration information.

A degree of deterioration of a secondary battery corresponding to time elapsed since the first time point is thus obtained based on the deterioration straight line. Therefore, recognition of abrupt increase in degree of deterioration of the secondary battery soon after start of use of the electrically powered vehicle when a user obtains deterioration information output from the output unit is suppressed. Consequently, strange feeling about change in degree of deterioration of the secondary battery felt by the user who has obtained the deterioration information or misunderstanding as failure of the secondary battery can be suppressed.

A deterioration information output method according to another aspect of the present disclosure includes accumulating use history data of a secondary battery mounted as a motive power source for an electrically powered vehicle, estimating based on the use history data, a first degree of deterioration of the secondary battery at a first time point after lapse of a predetermined period since start of use of the electrically powered vehicle, setting a deterioration curve representing change over time in degree of deterioration of the secondary battery since the start of use based on the estimated first degree of deterioration, estimating based on the deterioration curve, a second degree of deterioration of the secondary battery at a second time point later than the first time point, setting a deterioration straight line representing linear change over time from the first time point until the second time point in degree of deterioration of the secondary battery from an initial value to the second degree of deterioration, obtaining the degree of deterioration of the secondary battery corresponding to time elapsed since the first time point based on the deterioration straight line and setting deterioration information on the degree of deterioration of the secondary battery, and outputting the deterioration information.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 3 is a flowchart for illustrating one example of processing for accumulating battery use history data of the electrically powered vehicle.

FIG. 4 is a flowchart showing one example of processing performed by a controller.

FIG. 5 is a scatter diagram of a battery temperature and an SOC based on battery use history data.

FIG. 6 is a histogram of a battery temperature in a certain SOC range obtained from the scatter diagram in FIG. 5.

FIG. 7 shows a table illustrating exemplary definition of a region of use of a secondary battery.

DESCRIPTION OF THE PREFERRED EMBODIMENTS

Figure 1:
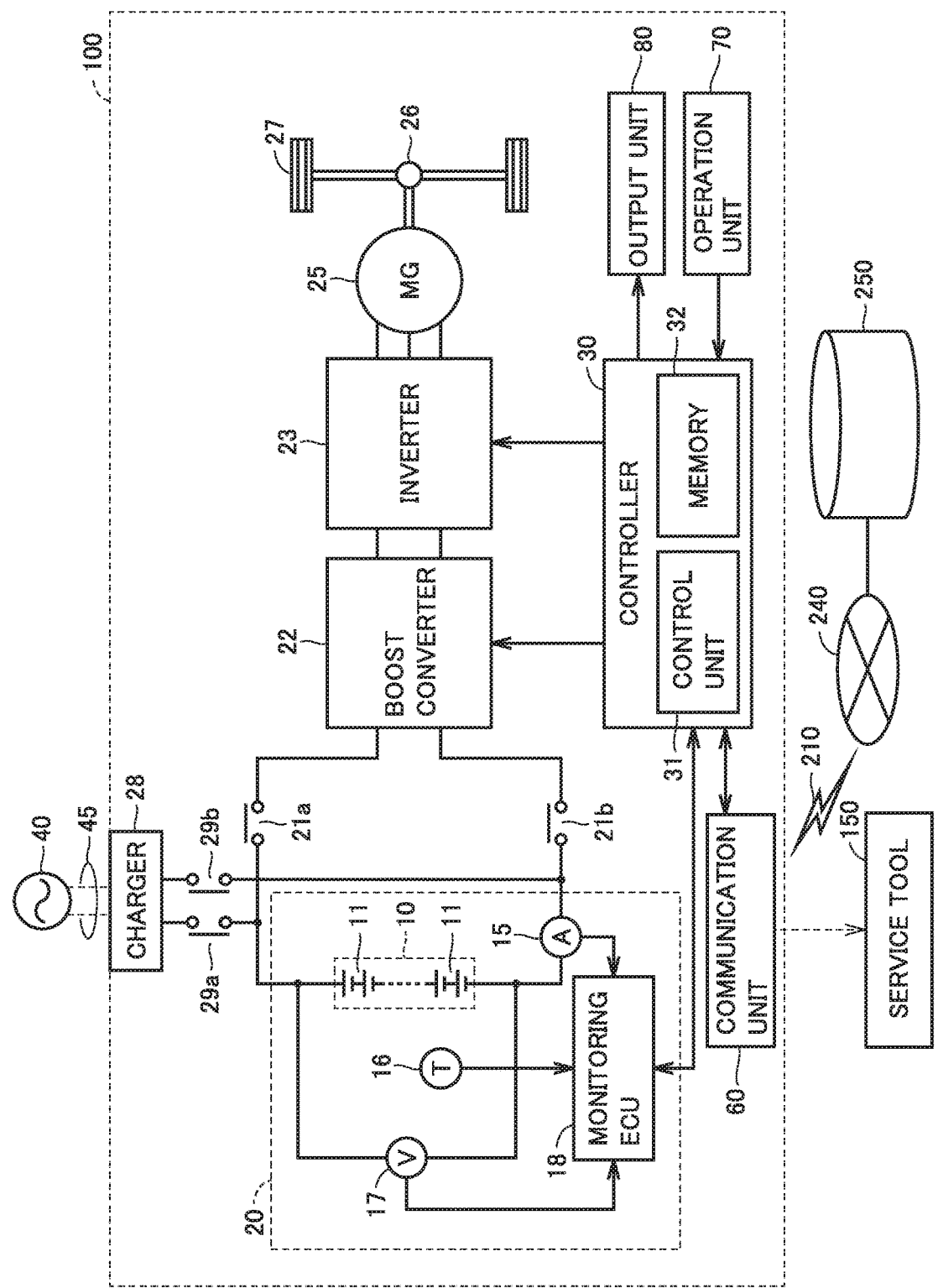
FIG. 1 is a block diagram showing an exemplary configuration of an electrically powered vehicle in the present embodiment.

An embodiment of the present disclosure will be described below in detail with reference to the drawings. The same or corresponding elements in the drawings below have the same reference characters allotted and description thereof will not be repeated in principle.

FIG. 1 is a block diagram showing an exemplary configuration of an electrically powered vehicle in the present embodiment. Referring to FIG. 1, a main battery 10 representing a vehicle-mounted secondary battery is mounted on an electrically powered vehicle 100. Electrically powered vehicle 100 is implemented, for example, as a hybrid vehicle or an electric vehicle including main battery 10 as a vehicle driving power supply (that is, a motive power source). The hybrid vehicle is a vehicle including, in addition to a battery, a fuel cell or an engine which is not shown as a source of motive power for running the vehicle. The electric vehicle is a vehicle including only a battery as a source of motive power of the vehicle.

Electrically powered vehicle 100 includes main battery 10, a boost converter 22, an inverter 23, a motor generator 25, a transmission gear 26, a drive wheel 27, and a controller 30.

Main battery 10 is implemented as a battery assembly (a battery pack) 20 including a plurality of battery modules 11. Each battery module 11 includes a rechargeable secondary battery cell represented by a lithium ion secondary battery and a nickel metal hydride secondary battery.

A current sensor 15, a temperature sensor 16, a voltage sensor 17, and a battery monitoring unit 18 are further arranged in battery pack 20. Battery monitoring unit 18 is implemented, for example, by an electronic control unit (ECU). Battery monitoring unit 18 is also referred to as a monitoring ECU 18 below.

Current sensor 15 detects currents Ib input to and output from main battery 10 (hereinafter also referred to as a battery current Ib). Temperature sensor 16 detects a temperature of main battery 10 (hereinafter also referred to as a battery temperature Tb). A plurality of temperature sensors 16 may be arranged. In this case, a weighted average value, a maximal value, or a minimal value of temperatures detected by the plurality of temperature sensors 16 can be used as battery temperature Tb or a temperature detected by specific temperature sensor 16 can be used as battery temperature Tb. Voltage sensor 17 detects a voltage output from main battery 10 (hereinafter also referred to as a battery voltage Vb).

Monitoring ECU 18 receives detection values from current sensor 15, temperature sensor 16, and voltage sensor 17. Monitoring ECU 18 outputs battery voltage Vb, battery current Ib, and battery temperature Tb to controller 30. Alternatively, monitoring ECU 18 can store also data on battery voltage Vb, battery current Ib, and battery temperature Tb in an embedded memory (not shown).

Monitoring ECU 18 is provided with a function to calculate a state of charge (SOC) of main battery 10 by using at least one of battery voltage Vb, battery current Ib, and battery temperature Tb. The SOC is represented by a percentage of a current amount of stored energy to a full charge capacity of main battery 10. Controller 30 which will be described later can also be provided with a function to calculate an SOC.

Main battery 10 is connected to boost converter 22 with system main relays 21a and 21b being interposed. Boost converter 22 boosts an output voltage from main battery 10. Boost converter 22 is connected to inverter 23, which converts direct-current (DC) power from boost converter 22 into alternating-current (AC) power.

Motor generator (three-phase AC motor) 25 generates kinetic energy for running a vehicle by receiving AC power from inverter 23. Kinetic energy generated by motor generator 25 is transmitted to drive wheels 27. When the vehicle is decelerated or stopped, motor generator 25 converts kinetic energy generated during braking of the vehicle into electric energy. AC power generated in motor generator 25 is converted to DC power by inverter 23. Boost converter 22 down-converts an output voltage from inverter 23 and supplies the resultant voltage to main battery 10. Regenerative power can thus be stored in main battery 10. Motor generator 25 is thus configured to generate driving force or braking force of the vehicle with supply and reception of electric power to and from main battery 10 (that is, charging and discharging of main battery 10).

Boost converter 22 does not have to be provided. When a DC motor is employed as motor generator 25, inverter 23 does not have to be provided.

When electrically powered vehicle 100 is implemented by a hybrid vehicle in which an engine (not shown) is further mounted as a motive power source, output from the engine in addition to output from motor generator 25 can be used as driving force for running a vehicle. Alternatively, a motor generator (not shown) generating electric power with output from the engine can also further be mounted to generate electric power for charging main battery 10 with output from the engine.

Controller 30 is implemented, for example, by an electronic control unit (ECU), and includes a control unit 31 and a memory 32. Control unit 31 is implemented, for example, by a central processing unit (CPU). Memory 32 stores a program for operating control unit 31 or various types of data. Memory 32 can also be provided outside controller 30 so long as control unit 31 can read data therefrom and write data therein.

Controller 30 controls operations by system main relays 21a and 21b, boost converter 22, and inverter 23. When an ignition switch (not shown) is switched from off to on, controller 30 switches system main relays 21a and 21b from off to on and operates boost converter 22 and inverter 23. When the ignition switch is switched from on to off, controller 30 switches system main relays 21a and 21b from on to off and stops an operation of boost converter 22 and inverter 23.

Electrically powered vehicle 100 further includes a communication unit 60, an operation unit 70, and an output unit 80. Operation unit 70 includes an operation switch for a user of electrically powered vehicle 100 to input various operation commands. Operation unit 70 can be implemented by a hardware mechanism such as a push switch or a touch switch provided on a touch panel by software. An instruction from a user which has been input to operation unit 70 is input to controller 30.

Output unit 80 is configured to output a visual or auditory message to a user of electrically powered vehicle 100 in response to a control command from controller 30. In the present embodiment, for example, output unit 80 can be implemented as a display such as a liquid crystal panel. Output unit 80 may be provided, for example, in a combination meter visually recognizable by the user of electrically powered vehicle 100 when the user takes a seat at a driver's seat.

Figure 2:
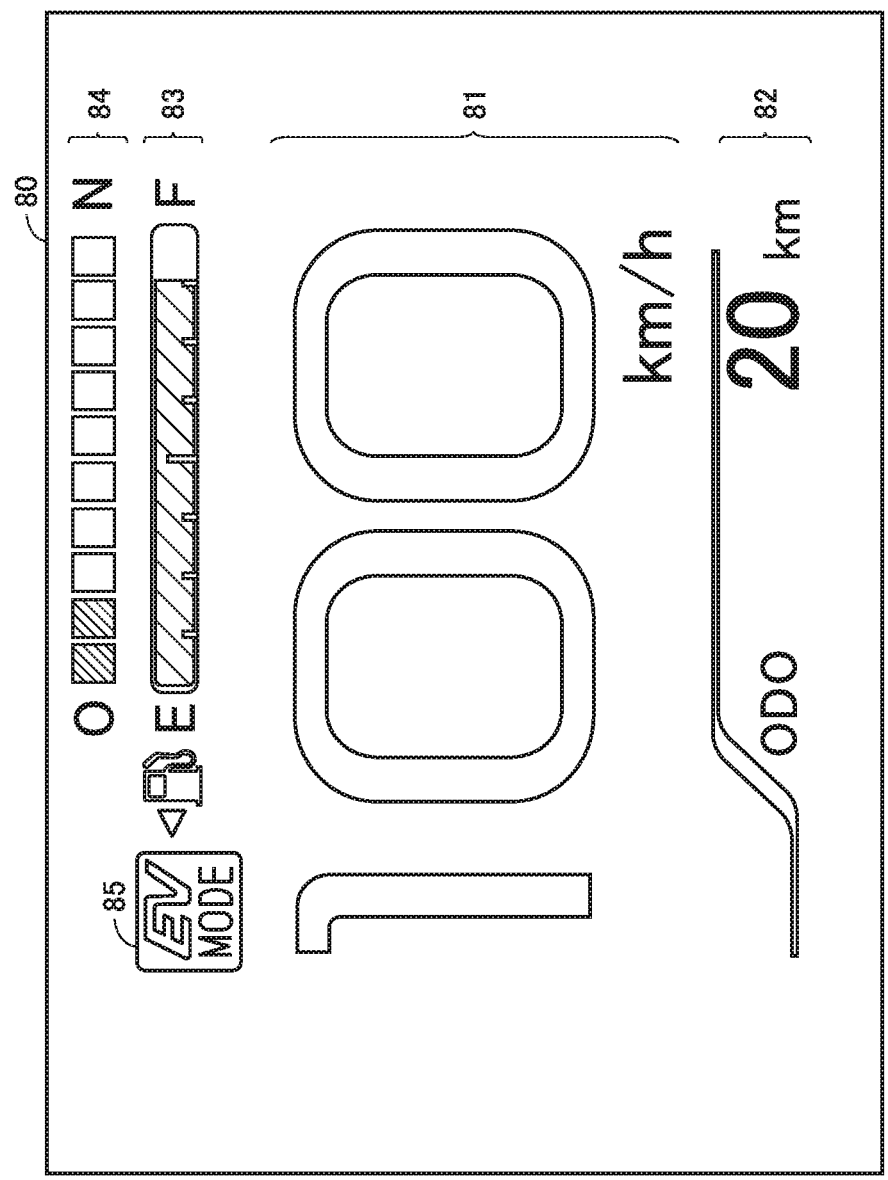
FIG. 2 is a diagram showing one example of a representation configuration on an output unit.

FIG. 2 is a diagram showing one example of a representation configuration on output unit 80. As shown in FIG. 2, output unit 80 outputs (shows) a prescribed display image on a display screen such as a liquid crystal panel. The prescribed display image includes, for example, a first display area 81 where information on a speed is shown, a second display area 82 where information on a traveled distance is shown, a third display area 83 where information on a remaining capacity of main battery 10 is shown, a fourth display area 84 where information on a capacity retention of main battery 10 is shown, and a fifth display area 85 where information on a selected running mode is shown.

In third display area 83, a level of a remaining capacity is shown by a hatched region, and a state that a current SOC is lower by one mark than the SOC in a fully charged state is shown.

In fourth display area 84, a degree of deterioration (capacity retention) of main battery 10 is shown in ten levels. When the degree of deterioration is at the initial value, ten rectangular icons arranged as being horizontally aligned are turned on, and an icon is turned off sequentially from the right as deterioration of main battery 10 proceeds.

Controller 30 obtains various types of information at prescribed timing and controls output unit 80 to update shown contents.

Operation unit 70 and output unit 80 can also be implemented as an integrated device by employing a touch panel. Alternatively, output unit 80 may output an auditory message through a speaker or the like, in addition to or instead of a visual message.

Referring back to FIG. 1, communication unit 60 functions to establish a communication path 210 with the outside of electrically powered vehicle 100 and to establish wireless communication. For example, communication unit 60 can be implemented, for example, by a vehicle-mounted wireless communication module.

Electrically powered vehicle 100 can bidirectionally communicate data with a data center 250 by connecting to a wide area communication network 240 (representatively the Internet) through communication path 210 by means of communication unit 60. Data center 250 can bidirectionally communicate data with a plurality of electrically powered vehicles including electrically powered vehicle 100 through wide area communication network 240. Data center 250 includes, for example, a memory configured to store various types of information, an output unit configured to output various types of information (including, for example, a communication apparatus capable of communicating with electrically powered vehicle 100 or a portable terminal of a user, or a display), and a control unit configured to control the memory and the output unit (none of which are shown).

Communication unit 60 further functions to transmit prescribed information on electrically powered vehicle 100 to a service tool 150 outside electrically powered vehicle 100. The prescribed information includes information on at least a degree of deterioration (capacity retention) which will be described later.

Service tool 150 is connected, for example, to communication unit 60 by wired connection, and receives prescribed information from communication unit 60. Service tool 150 includes, for example, a memory configured to store various types of information, an output unit configured to output various types of information (for example, a display), and a control unit configured to control the memory and the output unit (none of which are shown).

Electrically powered vehicle 100 may further be configured to be provided with an external charging function to charge main battery 10 with an external power supply 40. In this case, electrically powered vehicle 100 further includes a charger 28 and charge relays 29a and 29b.

External power supply 40 is a power supply provided outside a vehicle, and for example, a commercial AC power supply can be applied as external power supply 40. Charger 28 converts electric power from external power supply 40 to charging power for main battery 10. Charger 28 is connected to main battery 10 with charge relays 29a and 29b being interposed. When charge relays 29a and 29b are turned on, main battery 10 can be charged with electric power from external power supply 40.

External power supply 40 and charger 28 can be connected to each other, for example, through a charging cable 45. As external power supply 40 and charger 28 are electrically connected to each other when charging cable 45 is attached, main battery 10 can be charged with external power supply 40. Alternatively, electrically powered vehicle 100 may be configured such that electric power is wirelessly transmitted between external power supply 40 and charger 28. For example, main battery 10 can be charged by external power supply 40 by transmitting electric power through a power transmission coil (not shown) on a side of the external power supply and a power reception coil (not shown) on a side of the vehicle.

In an example where AC power is thus supplied from external power supply 40, charger 28 is configured to be provided with a function to convert supply power (AC power) from external power supply 40 to charging power (DC power) for main battery 10. Alternatively, in an example where external power supply 40 directly supplies charging power for main battery 10, charger 28 should only transfer DC power from external power supply 40 to main battery 10. A manner of external charging of electrically powered vehicle 100 is not particularly limited.

Electrically powered vehicle 100 runs while main battery 10 is charged and discharging. When the electrically powered vehicle is provided with the external charging function, main battery 10 is charged while electrically powered vehicle 100 is parked. As electrically powered vehicle 100 is thus used, main battery 100 deteriorates over time. Progress of deterioration of main battery 10, however, has been known to significantly vary depending on a history of patterns of driving by a driver or temperature states of main battery 10. Therefore, the electrically powered vehicle according to the present embodiment performs processing for accumulating battery use history data as below in order to diagnose deterioration of main battery 10 which will be described later.

FIG. 3 is a flowchart for illustrating one example of processing for accumulating battery use history data of the electrically powered vehicle. Processing in accordance with the flowchart shown in FIG. 3 can be performed by controller 30.

Referring to FIG. 3, controller 30 determines in step (the step being denoted as S below) 100 whether or not a certain time period has elapsed since previous transmission of battery use history data. For example, a not-shown timer contained in controller 30 can count an elapsed time since previous transmission of battery use history data. For example, the certain time period can be set to approximately several hours, approximately several days, or approximately several months.

Controller 30 has the timer continue counting in step S110 until the certain time period elapses (NO in S100). As shown in FIG. 1, controller 30 can obtain battery current Ib, battery voltage Vb, and battery temperature Tb as well as an SOC of main battery 10 at any timing by means of monitoring ECU 18.

When the certain time period has elapsed (YES in S100), in S120, controller 30 has memory 32 accumulate battery use history data of main battery 10. For example, data on current values of battery temperature Tb and an SOC and a battery current square value ($Ib^2$) indicating a battery load can be accumulated as battery use history data. In S120, a value of count by the timer is cleared as battery use history data is accumulated.

The battery use history data can be data on an instantaneous value at each timing every time a certain time period elapses. Alternatively, data resulting from statistical processing of battery temperature Tb, an SOC, and a battery load (for example, an average value) within the certain time period may be stored in memory 32 as battery use history data. Consequently, controller 30 can diagnose deterioration of the battery of a subject vehicle by using the battery use history data since start of use of main battery 10 (a new battery) stored in memory 32. The battery use history data may be transmitted to data center 250 through communication unit 60 or output to service tool 150 when service tool 150 is connected.

The processing shown in FIG. 3 is performed throughout running (an ignition switch being on) and non-running (the ignition switch being off) of the electrically powered vehicle. The processing in FIG. 3 is performed also while electrically powered vehicle 100 is being parked and let stand and while electrically powered vehicle 100 is externally charged, and a time period of use of the secondary battery (main battery 10) includes both of a time period of running and a time period of non-running of electrically powered vehicle 100. Thus, use history data of main battery 10 can periodically be obtained. Then, a degree of deterioration of main battery 10 can be estimated based on the obtained battery use history data of main battery 10. Therefore, a highly accurate degree of deterioration can be output to a user or the like of electrically powered vehicle 100.

In general, however, a full charge capacity of main battery 10 representing a secondary battery has such characteristics that a rate of deterioration thereof in an initial stage is higher than a subsequent rate of deterioration. Therefore, when highly accurate information on a degree of deterioration of main battery 10 is output to a user or the like, the information that the degree of deterioration of main battery 10 has increased soon after start of use of delivered electrically powered vehicle 100 may be output to the user or the like. Consequently, the user may feel strange about change in degree of deterioration of main battery 10 or misunderstand such a situation as failure of main battery 10.

In the present embodiment, controller 30 is assumed to operate as below. Specifically, controller 30 estimates a first degree of deterioration of main battery 10 at a first time point after lapse of a predetermined period since start of use of electrically powered vehicle 100 based on use history data of main battery 10. Controller 30 sets a deterioration curve representing change over time in degree of deterioration of main battery 10 since start of use based on the estimated first degree of deterioration. Controller 30 estimates a second degree of deterioration of main battery 10 at a second time point later than the first time point based on the set deterioration curve. Controller 30 sets a deterioration straight line representing linear change over time from the first time point until the second time point in degree of deterioration of main battery 10 from an initial value to the second degree of deterioration. Controller 30 obtains the degree of deterioration of main battery 10 corresponding to time elapsed since the first time point based on the deterioration straight line. Controller 30 sets deterioration information based on the obtained degree of deterioration and has output unit 80 output the deterioration information. In the present embodiment, control unit 31 and memory 32 of controller 30 and output unit 80 implement the "deterioration information output apparatus."

Thus, the degree of deterioration of main battery 10 corresponding to time elapsed since the first time point is obtained based on the deterioration straight line. Therefore, recognition of abrupt increase in degree of deterioration of main battery 10 soon after start of use of electrically powered vehicle 100 when a user obtains deterioration information output from output unit 80 is suppressed. Consequently, strange feeling about change in degree of deterioration of main battery 10 felt by the user who has obtained the deterioration information or misunderstanding as failure of main battery 10 can be suppressed.

Processing for outputting deterioration information of main battery 10 to a user will be described below with reference to FIG. 4. FIG. 4 is a flowchart showing one example of processing performed by controller 30.

Controller 30 determines in S200 whether or not prescribed deterioration diagnosis timing has come. The prescribed deterioration diagnosis timing corresponds to the first time point after lapse of a predetermined period since start of use of electrically powered vehicle 100 described above. The predetermined period includes, for example, a period of approximately several months, with a period from a time point of manufacturing of electrically powered vehicle 100 until delivery thereof to a user being supposed. When it is determined that the prescribed deterioration diagnosis timing has come (YES in S200), the process makes transition to S210.

Controller 30 estimates in S210 a degree of deterioration of main battery 10 based on battery use history data of electrically powered vehicle 100 stored in memory 32.

In the present embodiment, by way of example, a deterioration degree of a secondary battery is quantitatively evaluated by using a "capacity retention" defined as a percentage of a current full charge capacity (Ah) with respect to a full charge capacity at the time when the battery was new. It is understood from the definition that a degree of deterioration of a secondary battery is lower as a capacity retention is higher and the degree of deterioration of the secondary battery is higher as the capacity retention is lower.

The SOC of the secondary battery represents in percentage, a ratio of a current amount of stored power with respect to a current full charge capacity as described above. Therefore, lowering in full charge capacity itself as expressed by capacity retention <1.0 means decrease in actual amount of stored power (Ah) in spite of an SOC value being the same (for example, SOC=100%).

One example of processing for estimating a deterioration degree of main battery 10 will now be described with reference to FIGS. 5 to 7.

FIG. 5 is a scatter diagram of an SOC (%) and battery temperature Tb representing battery use history data accumulated in the control processing shown in FIG. 3. The abscissa in FIG. 5 represents an SOC (%) and the ordinate in FIG. 5 represents a battery temperature (° C.).

Referring to FIG. 5, combination of battery temperature Tb and an SOC (%) in battery use history data obtained at each timing is obtained as each plot in the scatter diagram. The scatter diagram in FIG. 5 shows tendency of use of main battery 10 in connection with at which temperatures and SOCs it has been used so far.

FIG. 6 is a histogram of battery temperatures Tb in a certain SOC range obtained from the scatter diagram shown in FIG. 5.

For example, FIG. 6 shows a distribution of frequencies for each range set in 10 (° C.) increments of battery temperature Tb by using the battery use history data in a range of SOCs from 70 to 80(%) in FIG. 5. A distribution of frequencies similar to that in FIG. 6 can thus be found for each SOC (%) range.

Since a frequency of appearance of each SOC range can be found, in each SOC range, a probability of occurrence for each region of use defined by a combination of an SOC range and a battery temperature range can be found based on multiplication of the frequency of appearance by the distribution of frequencies for each battery temperature range as in FIG. 6.

FIG. 7 shows a table illustrating exemplary definition of a region of use of a secondary battery. Referring to FIG. 7, n×m regions of use R11 to Rmn can be defined based on combination between m (m: a natural number not smaller than 2) SOC ranges set in 5(%) increments and n (n: a natural number not smaller than 2) battery temperature ranges set in 5 (° C.) increments.

As described above, a probability of appearance of m SOC ranges can be found and a distribution of frequencies in a battery temperature range set in 5 (° C.) increments can be found in each SOC range. Therefore, frequencies of occurrence P11 to Pmn corresponding to respective regions of use R11 to Rmn can be calculated in accordance with a product of the probability of appearance of each SOC range and the frequency of appearance of each battery temperature range in the SOC range. The total sum of frequencies of occurrence P11 to Pmn is 1.0.

In general, a secondary battery has been known to be higher in rate of progress of deterioration over time when a high-temperature and high-SOC condition continues. With such characteristics of the secondary battery being reflected, in each of regions of use R11 to Rmn, a unit degree of progress of deterioration when main battery 10 is used for a unit time period (for example, 1 hour) in each region can be determined in advance. The unit deterioration progress degree is represented by an amount of lowering (%/h) in capacity retention per unit time. Thus, memory 32 stores in advance unit deterioration progress degrees C11 to Cmn in correspondence with respective regions of use R11 to Rmn.

With the use of a cumulative time period Tt (h) from start of use of main battery 10, time periods of use in regions of use R11 to Rmn are shown as Tt·P11 to Tt·Pmn. Then, a deterioration degree parameter R of main battery 10 at the current time point can be calculated in accordance with an expression (1) below by totaling the products of unit deterioration progress degrees C11 to Cmn and respective time periods of use in regions of use R11 to Rmn.

$$R = 1.0 - Tt \cdot (P11 \cdot C11 + \ldots + Pmn \cdot Cmn) \quad (1)$$

Deterioration degree parameter R corresponds to an estimated value for a capacity retention at the current time point. When main battery 10 is new, a condition of R=1.0 (that is, a capacity retention being 100(%)) is satisfied. It is understood that "1.0−R" in connection with deterioration degree parameter R in the expression (1) corresponds to a rate of lowering (that is, a deterioration degree) in full charge capacity from start of use. A deterioration degree of a secondary battery is estimated below based on deterioration degree parameter R, and smaller deterioration degree parameter R means a higher deterioration degree of main battery 10.

The expression (1) above can also be deformed to further combine estimation of a deterioration degree due to charging and discharging cycles, by using history data of a battery load ($Ib^2$). Controller 30 can estimate a deterioration degree of main battery 10 at the current time point at deterioration diagnosis timing by calculating such deterioration degree parameter R (S210). FIGS. 5 to 7 merely illustrate one example of processing for estimating a deterioration degree, and the processing in S210 can be performed with any technique so long as a deterioration degree parameter for quantitatively estimating a current deterioration degree can be calculated based on past battery use history data.

Referring back to FIG. 4, controller 30 sets in S220 a deterioration curve. Specifically, controller 30 sets the deterioration curve of main battery 10 based on deterioration degree parameter R calculated in S210.

For example, it is assumed that the capacity retention (degree of deterioration) lowers in proportion to the ½ power (that is, $t^{1/2}$) of an elapsed time (based on what is called the square root law). Then, a relational expression between the capacity retention and the elapsed time (for example, capacity retention=$\alpha \times$(elapsed time)$^{1/2}+\beta$) is derived by using two conditions that the capacity retention is at the initial value at the time point of start of use of electrically powered vehicle 100 and that the capacity retention attains to a capacity retention calculated based on deterioration degree parameter R at the deterioration diagnosis timing. Controller 30 sets the derived relational expression as the deterioration curve.

In S230, controller 30 sets a deterioration straight line. Specifically, controller 30 estimates based on the deterioration curve, the capacity retention (degree of deterioration) of main battery 10 at the second time point later than the prescribed deterioration diagnosis timing. Namely, controller 30 obtains a capacity retention at the second time point based on the deterioration curve. The second time point is predetermined, and may be set, for example, to a time point after lapse, for example, of several years (eight to ten years), with a time point of expiration of a warranty period of main battery 10 being supposed. When the deterioration straight line is set, controller 30 sets to on, a flag indicating that the deterioration straight line has already been set.

Controller 30 sets the deterioration straight line representing linear change over time from the first time point until the second time point in capacity retention of main battery 10 from the initial value (Qa=100%) to the capacity retention at the second time point. Controller 30 derives, for example, a relational expression between the capacity retention and the elapsed time (for example, capacity retention=γ×elapsed time+δ) and sets the derived relational expression as the deterioration straight line.

In S240, controller 30 obtains time elapsed since start of use of electrically powered vehicle 100.

In S250, controller 30 obtains the capacity retention corresponding to the obtained elapsed time, based on the obtained elapsed time and the deterioration straight line.

In S260, controller 30 controls output unit 80 to output the obtained capacity retention thereon (that is, to update representation to show the obtained capacity retention).

When it is determined that the deterioration diagnosis timing has not yet come (NO in S200), the process makes transition to S270. In S270, controller 30 determines whether or not the deterioration straight line has already been set. Controller 30 determines that the deterioration straight line has already been set when the flag indicating that the deterioration straight line described above has already been set is on. When it is determined that the deterioration straight line has already been set (YES in S270), the process makes transition to S240.

When it is determined that the deterioration straight line has not been set (NO in S270), the process makes transition to S280.

In S280, controller 30 controls output unit 80 to output (show) initial value Qa as the capacity retention.

Operations by electrically powered vehicle 100 according to the present embodiment based on the configuration and the flowchart as set forth above will be described with reference to FIG. 8.

Figure 8:
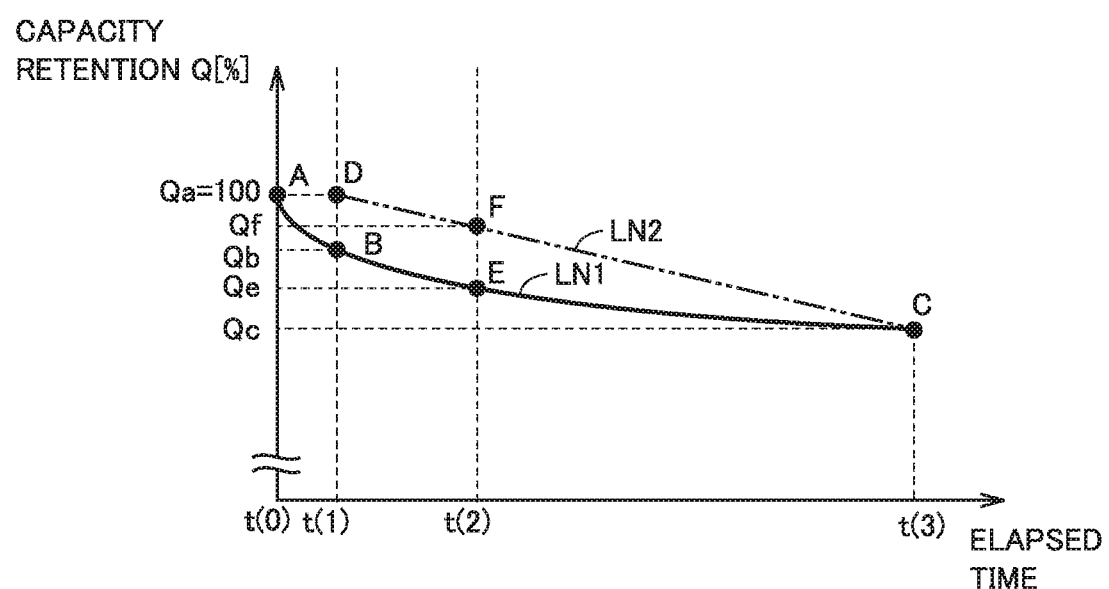
FIG. 8 is a timing chart showing change over time in capacity retention.

FIG. 8 is a timing chart showing change over time in capacity retention. The ordinate in FIG. 8 represents a capacity retention. The abscissa in FIG. 8 represents an elapsed time. LN1 (a solid line) in FIG. 8 represents the deterioration curve. LN2 (a chain double dotted line) in FIG. 8 represents the deterioration straight line.

At the time point of time t(0) when electrically powered vehicle 100 is manufactured, the capacity retention of main battery 10 is at initial value Qa (=100%). An actual capacity retention then lowers from initial value Qa each time electrically powered vehicle 100 is used for movement in transportation of electrically powered vehicle 100 to a dealer or the like. In electrically powered vehicle 100, each time a certain time period elapses (YES in S100), battery use history data is accumulated and transmitted to controller 30 (S120).

During a period until time t(1), it is determined that the deterioration diagnosis timing has not yet come (NO in S200) and that the deterioration straight line has not been set (NO in S270). Therefore, initial value Qa is output (shown) as the capacity retention on output unit 80 (S280).

When it is determined that deterioration diagnosis timing has come at time t(1) (YES in S200), a current capacity retention Qb is estimated based on battery use history data as shown at a B point in FIG. 8 (S210) and the deterioration curve is set based on the capacity retention at estimated time t(1) (S220).

Specifically, the relational expression between the capacity retention and the elapsed time is derived as described above by using an A point and the B point and the derived relational expression is set as the deterioration curve (LN1 in FIG. 8).

Then, a capacity retention Qc at time t(3) representing the second time point is estimated based on the set deterioration curve (see a C point in FIG. 8). Then, the straight line (LN2 in FIG. 8) representing linear change over time from time t(1) until time t(3) in capacity retention of main battery 10 from initial value Qa (see a D point in FIG. 8) to capacity retention Qc (see the C point in FIG. 8) at time t(3) is set as the deterioration straight line (S230).

After the deterioration straight line is set (YES in S270), controller 30 obtains the elapsed time (S240), obtains the capacity retention based on the elapsed time and the deterioration straight line (S250), and updates representation of the capacity retention on output unit 80 (S260). For example, at time t(2), not a capacity retention Qe on the deterioration curve (see an E point in FIG. 8) but a capacity retention Qf on the deterioration straight line (see an F point in FIG. 8) is obtained, and representation of the capacity retention on output unit 80 is updated.

As set forth above, according to electrically powered vehicle 100 in the present embodiment, the capacity retention (degree of deterioration) of main battery 10 corresponding to time elapsed since the first time point is obtained based on the deterioration straight line. Therefore, recognition of abrupt increase in degree of deterioration of main battery 10 soon after start of use of electrically powered vehicle 100 when a user obtains deterioration information output from output unit 80 is suppressed. Consequently, strange feeling about change in degree of deterioration of main battery 10 felt by the user who has obtained the deterioration information or misunderstanding as failure of main battery 10 can be suppressed. Therefore, a deterioration information output apparatus and a deterioration information output method for outputting deterioration information of a secondary battery without misleading a user can be provided.

A modification will be described below.

Though the embodiment above describes processing for setting a deterioration straight line based on battery use history data and updating representation of a capacity retention based on the set deterioration straight line as being performed in electrically powered vehicle 100, the processing may be performed, for example, in data center 250 or service tool 150.

For example, battery use history data is transmitted from communication unit 60 through communication path 210 and wide area communication network 240 to data center 250 and stored in the memory of data center 250. Then, the control unit of data center 250 calculates a degree of deterioration based on the battery use history data, sets the deterioration straight line based on the calculated degree of deterioration, and sets the capacity retention as deterioration information based on the set deterioration straight line. Then, the set deterioration information may be output from the output unit to electrically powered vehicle 100 or a portable terminal of a user.

Alternatively, battery use history data is transmitted from communication unit 60 to service tool 150 and stored in the memory of service tool 150. Then, the control unit of service tool 150 calculates a degree of deterioration based on the battery use history data, sets the deterioration straight line based on the calculated degree of deterioration, and sets the capacity retention as deterioration information based on the set deterioration straight line. Then, the set deterioration information may be output from the output unit of a display or the like of service tool 150.

Though the embodiment above describes a deterioration curve as being set based on the square root law, the deterioration curve may be set, for example, based on a predetermined reference deterioration curve.

Specifically, controller 30 may correct the reference deterioration curve in a predetermined shape with deterioration degree parameter R, in accordance with characteristics of main battery 10 including a type of a secondary battery or a type of electrically powered vehicle 100. The reference deterioration curve can be prepared in advance, for example, based on data on deterioration over time in an experiment under a standard use history. For example, information for defining a reference curve can be stored in memory 32. A deterioration curve may be set, for example, by correcting the reference curve in a direction to raise or lower a capacity retention so as to achieve a capacity retention corresponding to deterioration degree parameter R at prescribed deterioration diagnosis timing.

The embodiment above describes the capacity retention of main battery 10 as representing a degree of deterioration. For example, as the full charge capacity lowers due to deterioration of main battery 10, an upper limit value of a driving range at the time when main battery 10 is in the fully charged state also decreases. Therefore, the upper limit value of the driving range at the time when main battery 10 is in the fully charged state may represent the degree of deterioration.

The embodiment above describes a capacity retention (an electric current capacity retention) as representing a degree of deterioration with a unit "Ah" of the full charge capacity of main battery 10. A capacity retention (a power capacity retention), however, may represent a degree of deterioration, for example, with a unit "Wh" of the full charge capacity of main battery 10.

The entirety or a part of the modification may be carried out as being combined.

Though an embodiment of the present disclosure has been described, it should be understood that the embodiment disclosed herein is illustrative and non-restrictive in every respect. The scope of the present disclosure is defined by the terms of the claims and is intended to include any modifications within the scope and meaning equivalent to the terms of the claims.

What is claimed is:

1. A deterioration information output apparatus comprising:
   a memory configured to accumulate use history data of a secondary battery mounted as a motive power source for an electrically powered vehicle;
   an output unit configured to output deterioration information on a degree of deterioration of the secondary battery; and
   a control unit configured to set the deterioration information and have the output unit output the deterioration information,
   the control unit being configured to
   estimate based on the use history data, a first degree of deterioration of the secondary battery at a first time point after lapse of a predetermined period since start of use of the electrically powered vehicle,
   set a deterioration curve representing change over time in degree of deterioration of the secondary battery since the start of use based on the estimated first degree of deterioration,
   estimate based on the deterioration curve, a second degree of deterioration of the secondary battery at a second time point later than the first time point,
   set a deterioration straight line representing linear change over time in a degree of deterioration of the secondary battery from the first time point having an initial value until the second time point having the second degree of deterioration, the initial value being a degree of deterioration at the start of the use, and
   obtain the degree of deterioration of the secondary battery corresponding to time elapsed since the first time point based on the deterioration straight line and set the deterioration information.

2. A deterioration information output method comprising:
   accumulating use history data of a secondary battery mounted as a motive power source for an electrically powered vehicle;
   estimating based on the use history data, a first degree of deterioration of the secondary battery at a first time point after lapse of a predetermined period since start of use of the electrically powered vehicle;
   setting a deterioration curve representing change over time in degree of deterioration of the secondary battery since the start of use based on the estimated first degree of deterioration;
   estimating based on the deterioration curve, a second degree of deterioration of the secondary battery at a second time point later than the first time point;
   setting a deterioration straight line representing linear change over time in a degree of deterioration of the secondary battery from the first time point having an initial value until the second time point having the second degree of deterioration, the initial value being a degree of deterioration at the start of the use;
   obtaining the degree of deterioration of the secondary battery corresponding to time elapsed since the first time point based on the deterioration straight line and setting deterioration information on the degree of deterioration of the secondary battery; and
   outputting the deterioration information.

* * * * *